Sept. 5, 1961     H. D. SISK     2,998,948
CARGO-CARRYING AIRCRAFT
Filed July 28, 1959     7 Sheets-Sheet 1

INVENTOR.
HAROLD D. SISK,
BY
McMorrow, Berman + Davidson
ATTORNEYS.

Sept. 5, 1961  H. D. SISK  2,998,948
CARGO-CARRYING AIRCRAFT
Filed July 28, 1959  7 Sheets-Sheet 2

INVENTOR.
HAROLD D. SISK,
BY
McMorrow, Berman & Davidson
ATTORNEYS.

Sept. 5, 1961 H. D. SISK 2,998,948
CARGO-CARRYING AIRCRAFT
Filed July 28, 1959 7 Sheets-Sheet 3

INVENTOR.
HAROLD D. SISK,
BY
McMorrow, Berman + Davidson
ATTORNEYS.

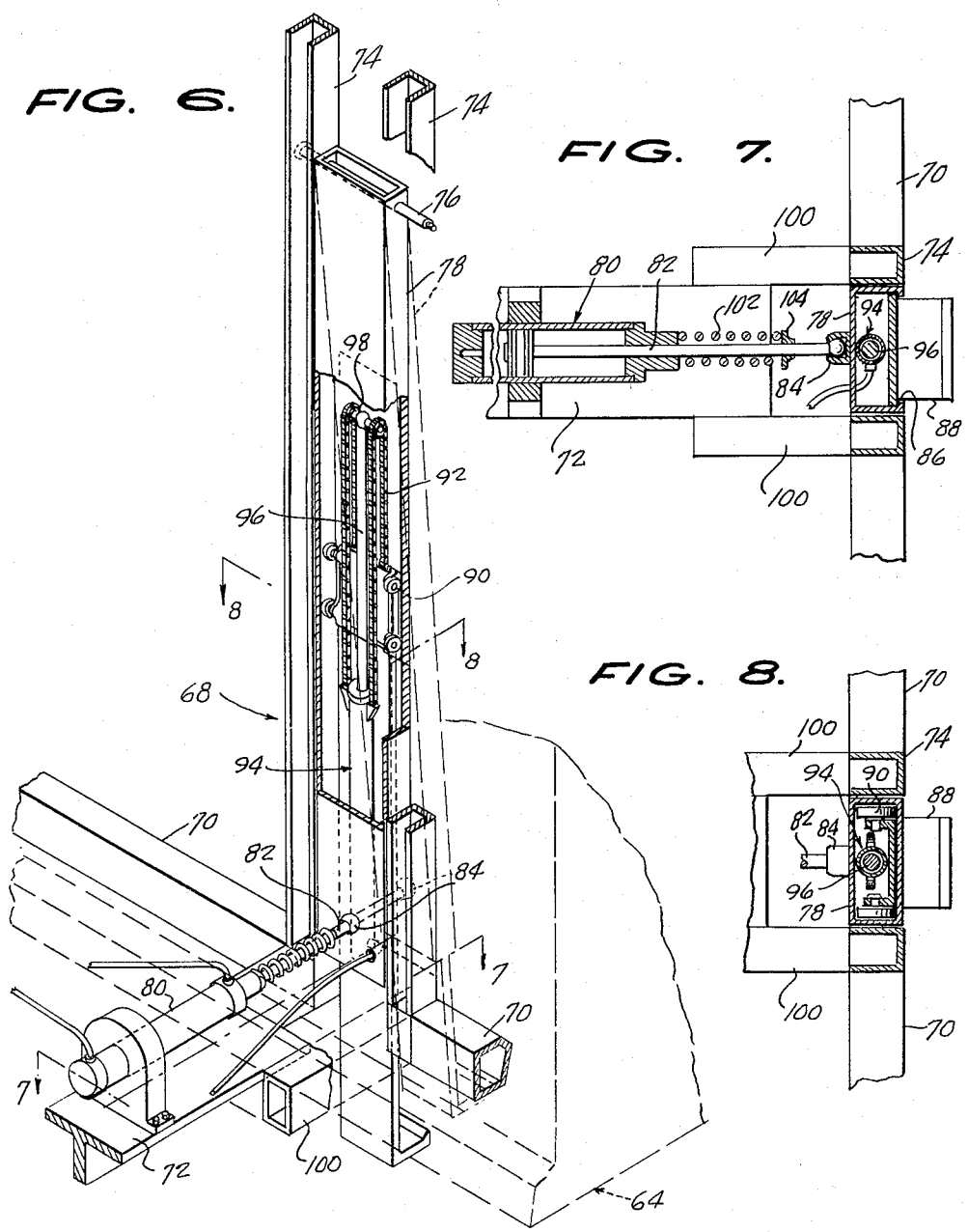

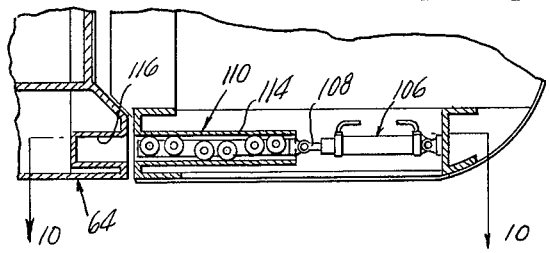
FIG. 9.
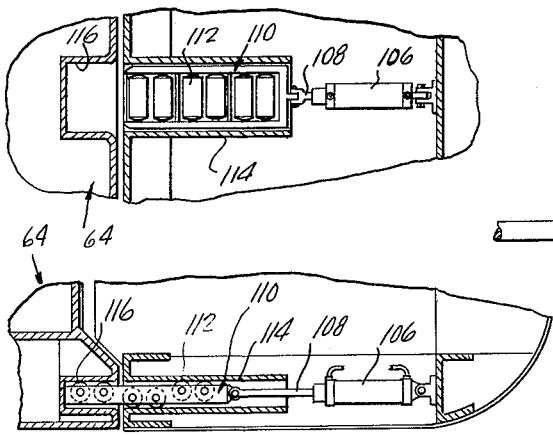
FIG. 10.
FIG. 11.
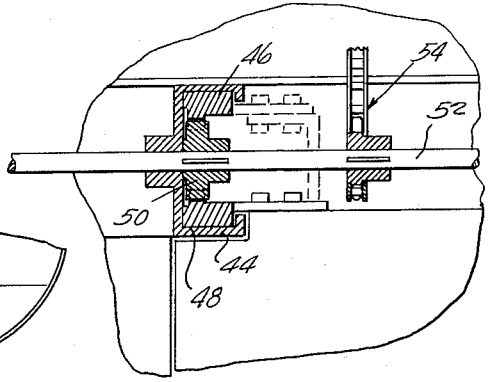
FIG. 13
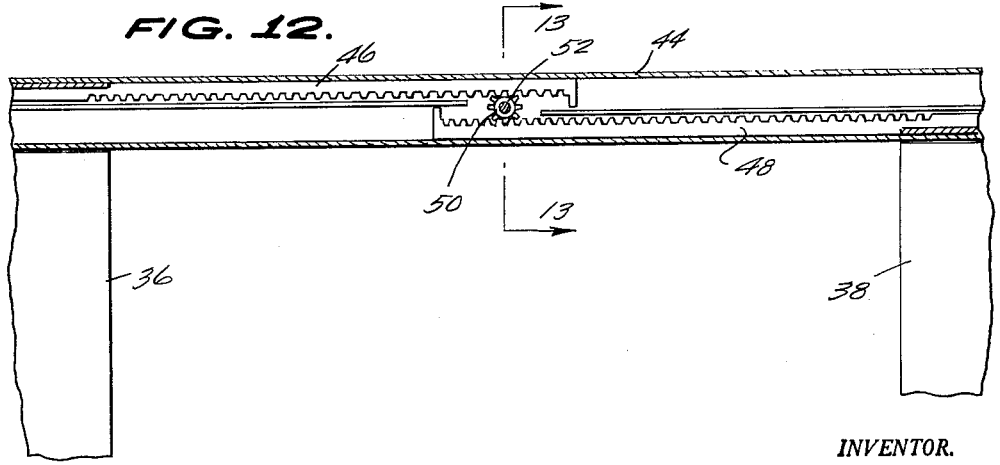
FIG. 12.

Sept. 5, 1961 H. D. SISK 2,998,948
CARGO-CARRYING AIRCRAFT

Filed July 28, 1959 7 Sheets-Sheet 6

INVENTOR.
HAROLD D. SISK,
BY
McMorrow, Berman & Davidson
ATTORNEYS.

Sept. 5, 1961 H. D. SISK 2,998,948
CARGO-CARRYING AIRCRAFT
Filed July 28, 1959 7 Sheets-Sheet 7
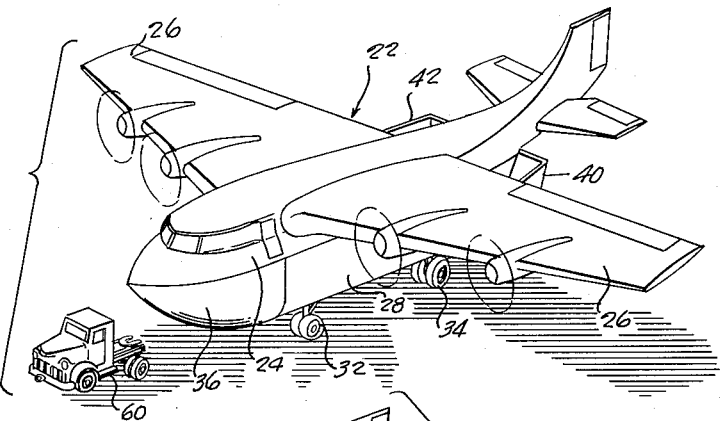
FIG. 19.
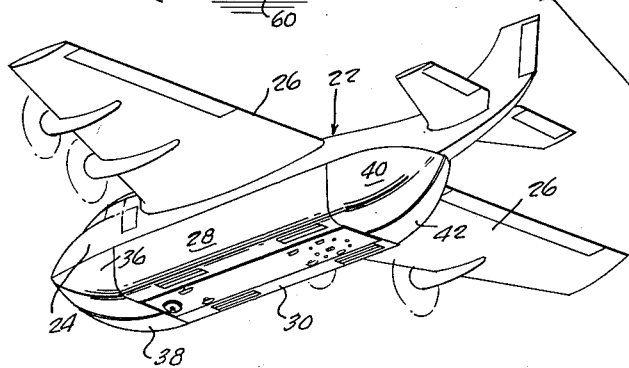
FIG. 20.
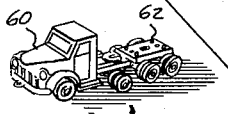
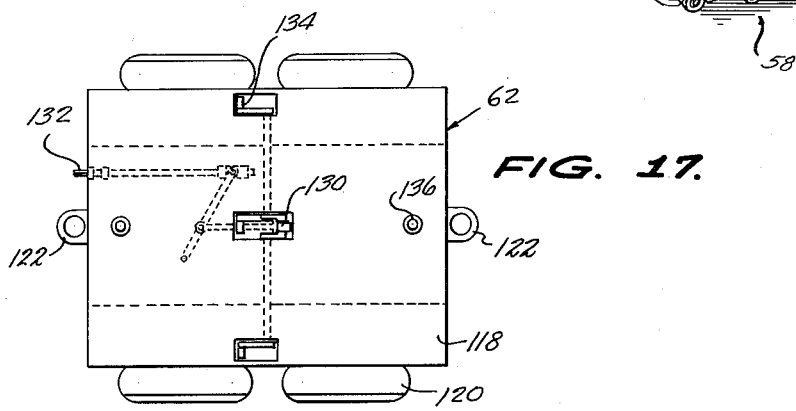
FIG. 17.
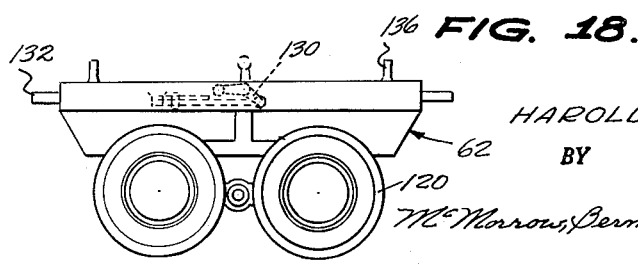
FIG. 18.
INVENTOR.
HAROLD D. SISK,
BY
McMorrow, Berman + Davidson
ATTORNEYS United States Patent Office 2,998,948
Patented Sept. 5, 1961

2,998,948
CARGO-CARRYING AIRCRAFT
Harold D. Sisk, Somerville, Mass.
(10 Baker Road, Arlington 74, Mass.)
Filed July 28, 1959, Ser. No. 830,069
4 Claims. (Cl. 244—137)

The present invention relates to a cargo-carrying aircraft

Previously proposed and presently in use are aircraft designed for the transport of cargo-enclosed units. Generally, an aircraft of this type is provided with a cargo space into which is shifted, by various means, a cargo-carrying frame, pallet, vehicle, or other body. Such an aircraft may be provided with a floor in the form of a ramp which lowers at one end or the other end of the cargo space and over which a cargo-carrying body is moved, or the aircraft may be provided with a door or doors closing one end or the other end of a cargo space, the doors swinging down to form a ramp or to form a loading platform. Another of this type of aircraft is provided with an extensile and retractile overhead trackway for shifting a cargo-carrying body into the cargo space. These and other means have been proposed and have been resorted to for expediting the transfer of the cargo into and out of the designated space, and while such means have been adopted in part in the industry, such means have not been wholly successful for many reasons.

A main reason for the fact that the cargo-carrying aircraft presently in use is not wholly successful is that heretofore no cargo-carrying body has been employed both for highway travel and air transport, and the cargo-carrying body designed for incorporation into the aircraft structure is difficult to adapt for highway use.

An object of the present invention is to provide a cargo-carrying aircraft in which the cargo-carrying body is readily and with facility shifted from the aircraft cargo space to a mobile frame, specifically, a tractor-trailer unit, for highway travel.

Another object of the present invention is to provide a cargo-carrying aircraft having a cargo-carrying body of commercial size and design of the type employed for highway travel on a tractor-trailer unit, one which lends itself to standardization and to manufacture in quantity at reasonable cost, and one which is highly effective in action.

A further object of the present invention is to provide, in a cargo-carrying aircraft, elevating and lowering means by which a cargo-carrying body may be quickly shifted into a cargo space and as quickly shifted from the cargo space onto a mobile frame.

A still further object of the present invention is to provide a cargo-carrying aircraft, in combination with a cargo-carrying body insertable into and withdrawable from the cargo space in the aircraft, a positive locking means for securing the cargo-carrying body within the cargo space, such locking means being automatic in operation and adaptable for use with cargo-carrying bodies presently employed with tractor-trailer units for highway travel.

These and other objects and advantages of the present invention will be fully apparent from the following description when taken in conjunction with the annexed drawings, in which:

FIGURE 6 is an isometric view of one of the elevating and lowering mechanisms employed in the aircraft, with portions broken away and on an enlarged scale;

FIGURE 7 is a view taken on the line 7—7 of FIGURE 6;

FIGURE 8 is a view taken on the line 8—8 of FIGURE 6;

FIGURE 9 is a view on an enlarged scale, taken on the line 9—9 of FIGURE 2, but showing the cargo body in elevated position and the locking mechanism in unlocked condition;

FIGURE 10 is a view taken on the line 10—10 of FIGURE 9;

FIGURE 11 is a view similar to FIGURE 9, but showing the locking mechanism in locked position;

FIGURE 12 is a view partially in section showing the means for closing one of the sets of doors;

FIGURE 13 is a view taken on the line 13—13 of FIGURE 12, and on an enlarged scale;

FIGURE 17 is a top plan view of a portion of the mobile ground vehicle employed to support the cargo body of the present invention;

FIGURE 18 is a side elevational view of the assembly shown in FIGURE 17;

Figure 1:
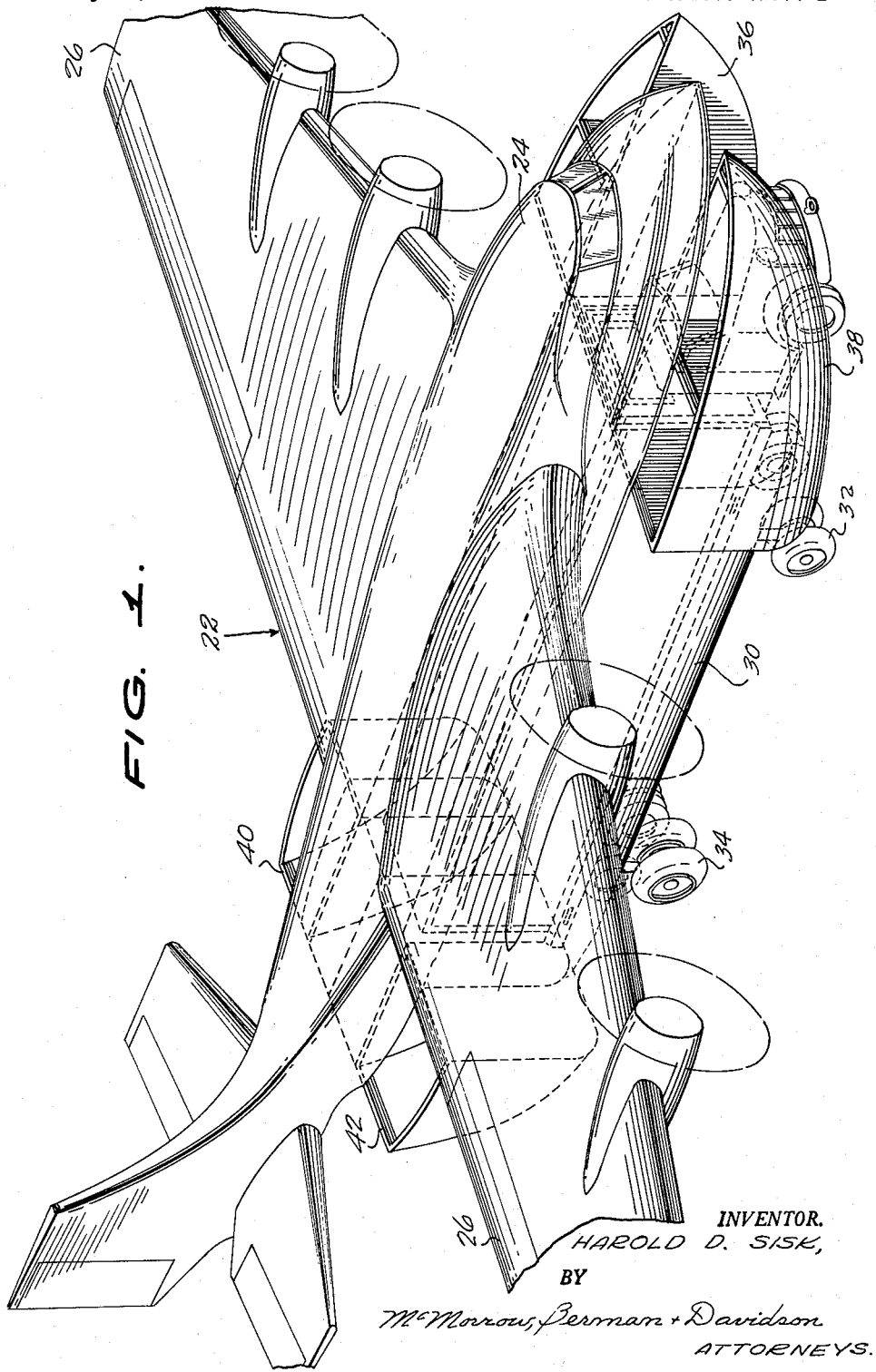
FIGURE 1 is an isometric view of the cargo-carrying aircraft according to the present invention with portions of the wings broken away and with a tractor-trailer unit including a cargo-carrying body shown in phantom view, the doors of the aircraft being shown in open position.

FIGURE 19 is an isometric view of the cargo-carrying aircraft according to the present invention with the cargo body installed therein and with the tractor of the ground vehicle in a position after leaving the cargo body in position within the aircraft cargo space; and FIGURE 20 is an isometric view of the cargo-carrying aircraft of the present invention with the cargo-carrying body installed therein and the aircraft in a position of flight, with the tractor-trailer ground vehicle assembled for transport on a highway without the cargo-carrying body.

Referring in greater detail to the drawings in which like numerals indicate like parts throughout the several views, the reference numeral 22 designates generally the cargo-carrying aircraft according to the present invention. The aircraft 22 includes a fuselage 24 and wings 26 projecting outwardly from the fuselage 24.

A pair of unstanding elongated wall members 28 and 30 are arranged in lateral spaced relation and are positioned beneath the fueslage 24 and have their upper ends dependingly carried by the fuselage 24.

Beneath each of the wall members 28 and 30 are at least two landing gear assemblies arranged in tandem spaced relation rollably engaging a ground surface when the aircraft is on the ground. The numerals 32 and 34 designate, in FIGURE 1, the landing gear assemblies associated with the wall member 30. Such landing gear assemblies are conventional and are connected to the adjacent wall member 28 or 30 for movement from the position engaging the ground surface to a nested position within the associated wall member 28 or 30.

A pair of doors 36 and 38 are arranged in side by side abutting relation at the forward end of the wall members 28 and 30 and normally close the space between the ends of the wall members 28 and 30. Another pair of doors 40 and 42 are similarly arranged with respect to the rearward end of the wall members 28 and 30, the doors 36 and 38 and the doors 40 and 42 being shown in open position in FIGURE 1.

Figure 2:
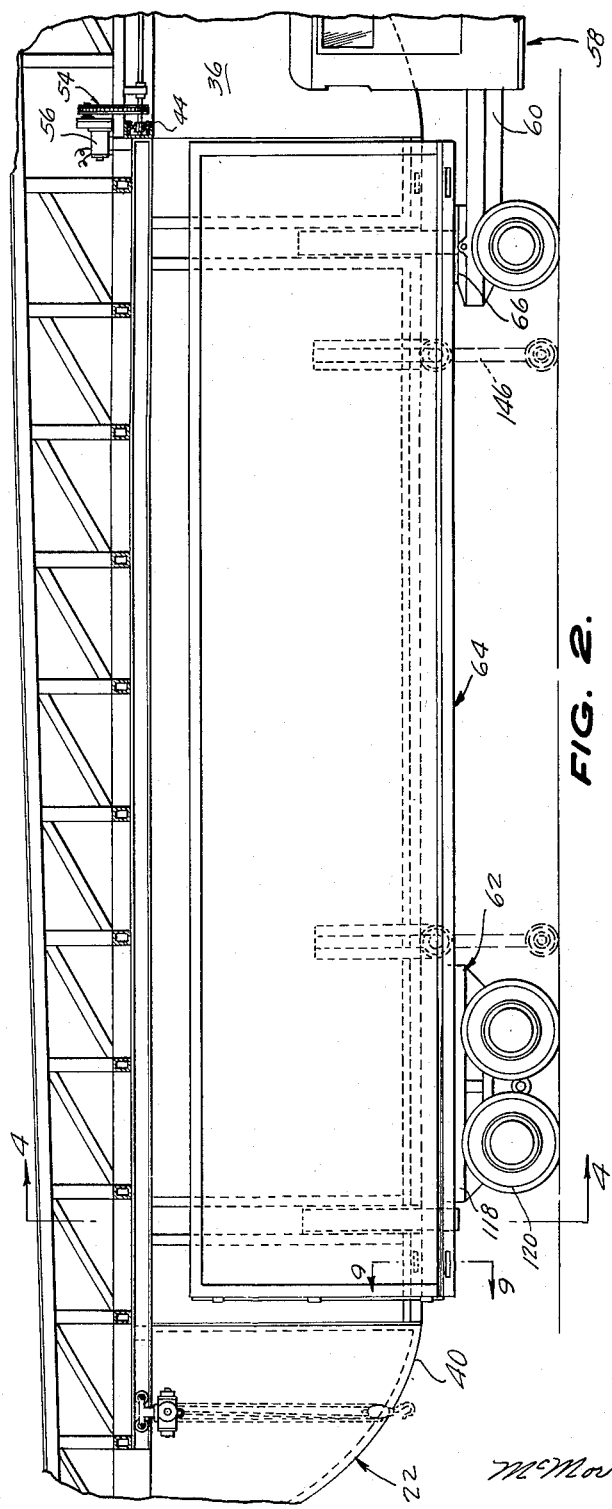
FIGURE 2 is an elevational view, as viewed from one side of the aircraft shown in FIGURE 1, showing the cargo-carrying body prior to being elevated into the cargo-carrying space of the aircraft, portions of the aircraft and the forward portion of the tractor unit being shown broken away.

Means is provided for effecting the opening and closing movement of each of the pairs of doors 36 and 38, 40 and 42, as shown in FIGURES 2, 12, and 13, with reference to the doors 36 and 38. Such means consists in a transversely arranged trackway 44 in which are slidable racks 46 and 48 to which are attached the doors 36 and 38, respectively, and which are driven by a pinion 50 mounted on a shaft 52 which is driven by a chain and sprocket wheel assembly 54 and an actuating mechanism or motor 56. A similar mechanism controls the opening and closing movement of the doors 40 and 42.

When the doors 36 and 38 are open and the doors 40 and 42 are open, the space between the wall members 28 and 30 is unobstructed for ingress and egress therethrough of a mobile ground vehicle having a cargo-carrying body thereon, such vehicle being designated generally by the reference numeral 58 and consisting in a tractor unit 60 and a dolly unit 62. A demountable cargo body 64 is supported upon the fifth wheel 66 of the tractor unit 60 and upon the dolly unit 62 when the vehicle 58 is in condition for travel over a highway.

The present invention provides elevating and lowering mechanisms 68 arranged in opposed relation and carried by the wall members 28 and 30. Each mechanism 68 is operable to engage the cargo body 64 when the latter is supported upon the dolly unit 62 and tractor unit 60 and the dolly unit 62 and tractor unit 60 is positioned between the wall members 28 and 30.

This mechanism 68 is shown most clearly in FIGURES 6 and 8 in which the cargo body 64 is indicated in dotted lines and the reference numeral 70 designates generally a structural member of the aircraft 22. It is to be understood that a structural member 70 extends along both sides of the cargo space defined by the wall members 28 and 30 and that one of the mechanisms 68 is adjacent each end of the cargo body 64 and on each side thereof.

A support plate 72 projects inwardly of the structural member 70 and a pair of upright posts 74 rise from the member 70 and straddle the inner end of the support plate 72. In FIGURE 6, the right hand post 74 is broken away to expose the details of the mechanism 68.

A pin 76 extends through the post 74 and supports the upper end portion of a hollow box-like trackway 78. A horizontally disposed hydraulic cylinder assembly 80 is supported upon the support plate 72 and has the free end of its actuating arm 82 connected by a ball and socket joint 84 to the lower end portion of the trackway 78. This structure is shown most clearly in FIGURE 7.

The face of the trackway 78 facing the cargo space is provided with a slot 86 extending from the lower end of the trackway 78 to a point substantially midlength of the trackway 78. An elongated hook 88 is movable upwardly and downwardly in the slot 86 and is also movable toward and away from the cargo space as it swings about the pin 76 as a horizontal axis. The upper end of the hook 88 is provided with rollers 90 slidably supporting the upper end of the hook 88 within the trackway 78. A pair of chains 92 have their one ends connected to the upper end of the hook 88 adjacent the rollers 90 and have their other ends connected to one end of a hydraulic cylinder assembly 94 disposed within the trackway 78. The actuating arm 96 of the hydraulic cylinder assembly 94 carries a cross shaft having sprocket wheels thereon, as at 98, over which travel the midportions of the chains 92. Upon introduction of hydraulic fluid into the hydraulic cylinder assembly 94, the arm 96 extends upwardly and draws the hook 88 upwardly from the extended position below the structural member 70 to a position, as shown in FIGURE 15, substantially at the same level as the member 70.

Figures 14, 15, 16:
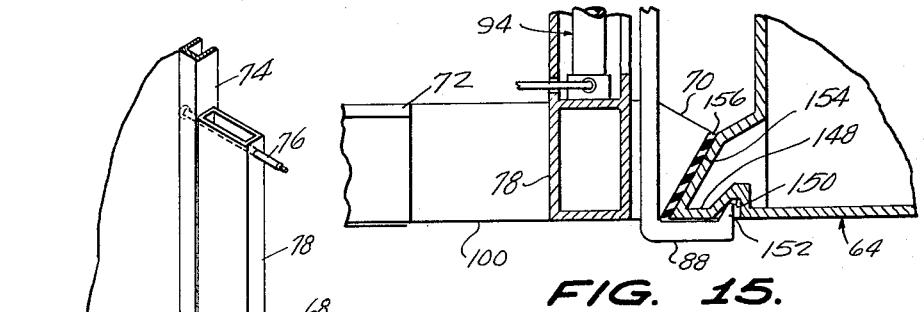
FIGURE 14 is an isometric view showing the elevating mechanism of FIGURE 6, as viewed from the cargo space.
FIGURE 15 is a view partially in section on an enlarged scale, of the assembly shown in FIGURE 14 and in locked condition on the flanged portion of a cargo body.
FIGURE 16 is a view on an enlarged scale, taken on the line 16—16 of FIGURE 4.

As shown in FIGURE 14, the structural member 70 is interrupted for the swinging movement therethrough of the hook 88 responsive to swinging movement of the trackway 78 about the pin 76 as a horizontal axis. Box frame members 100 project from the structural member 70 on each side of the trackway 78 and form a means of support for the support plate 72, as shown in FIGURE 6, only one of the box frame members 100 being shown for reasons of simplicity.

A spring 102 is circumposed about the portion of the actuating arm 82 adjacent the hydraulic cylinder assembly 80 and has one end bearing against the latter and the other end bearing against a collar 104 secured on the actuating arm 82. The spring 102 biases the hook 88 and trackway 78 outwardly of the structural member 70.

The present invention provides releasable holding means carried by the portion of the fuselage 24, specifically the wall members 28 and 30, adjacent the opening defined by the wall members 28 and 30 and engageable with the cargo carrying body 64 when the latter is supported within the cargo space on the mechanisms 68. This releasable holding means is shown in FIGURES 9 to 11, in which the numeral 106 designates generally another hydraulic cylinder assembly having an actuating arm 108. To the free end of the arm 108 is pivotally connected the bight of a U-shaped lock element 110 having a plurality of rollers 112 extending between the legs thereof. The rollers 112 support the lock element 110 for reciprocating movement within the open ended tunnel member 114 having one open end contiguous with the side of the cargo space defined by the wall members 28 and 30 and in registry with a socket 116 provided in the adjacent portion of the cargo carrying body 64.

As shown in FIGURE 9, the rollers 112 are staggered with respect to each other so that they bear on the upper and lower faces of the tunnel member 114 and upon actuation of the hydraulic cylinder assembly 106, the lock element 110 moves from the retracted position shown in FIGURE 9 wholly within the tunnel member 114 to an extended position in which a portion projects into the socket 116 in the cargo carrying body 64.

Referring to FIGURES 16 to 18, inclusive, the means by which the cargo carrying body 64 is attached to the dolly unit 62 is shown which means includes interlocking means carried by the platform 118 of the dolly unit 62 and carried on the underface of the cargo carrying body 64.

Two pairs of wheels 120 support the platform 118 for rolling movement over a ground surface and the platform 118 is provided at each end with attaching means or hitches 122 by means of which the tractor unit 60 may be attached. The cargo carrying body 64 is provided with a floor 124 in which there is a centrally located socket member 126 having an arcuately curved socket 128 therein. A latch member 130 is mounted within the platform 118 for movement from a recess position to an upright position received in and engaging the socket 128, as shown in FIGURE 16. A screw 132 journaled in the platform 118 is employed to shift the latch member 130 from the recess position to the extended position for securing the floor 124 to the platform 118.

Auxiliary latch members 134 are also connected to the screw 132 and are positioned adjacent the side edges of the platform 118 for engagement with complementally arranged sockets provided in the floor 124 of the cargo carrying body 64.

Positioning pins 136 project upwardly from the platform 118 and are received in other sockets 138 provided in the floor 124 of the cargo carrying body 64 for aligning the platform 118 with respect to the body 64.

Figure 3:
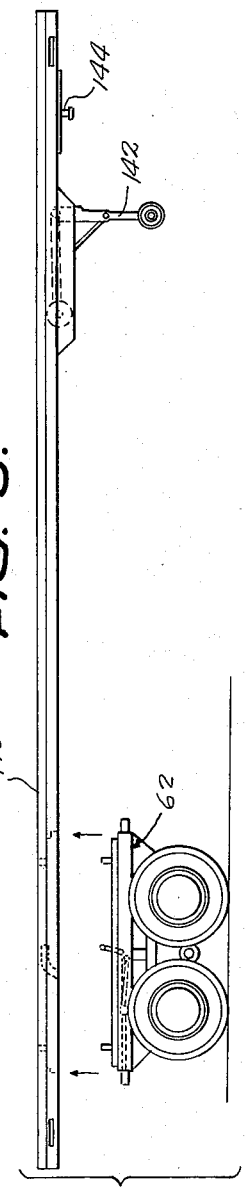
FIGURE 3 is a side elevational view of a modified form of the cargo-carrying body according to the present invention.
Figure 4:
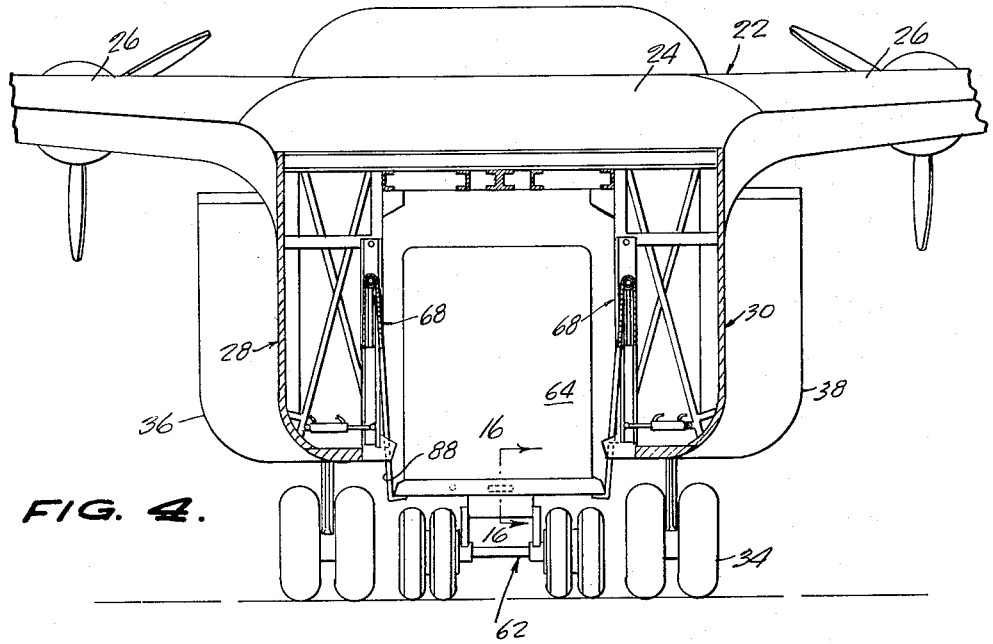
FIGURE 4 is an elevational view of the assembly shown in FIGURE 1, as seen on line 4—4 of FIGURE 2, the cargo-carrying body being shown prior to elevating into the cargo space.
Figure 5:
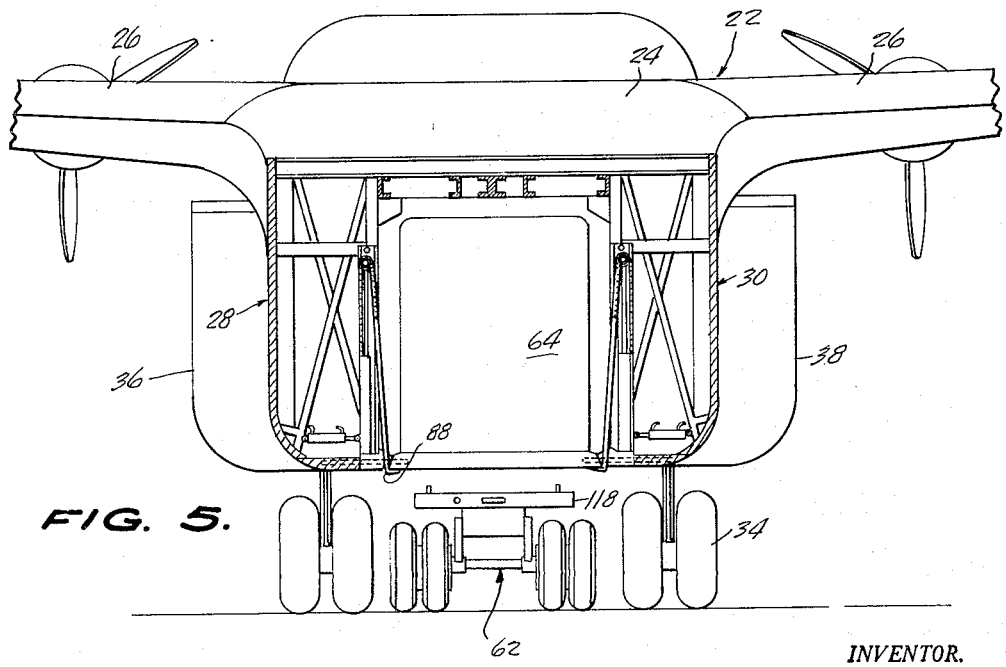
FIGURE 5 is a view similar to FIGURE 4, with the cargo-carrying body elevated into the cargo space.

In FIGURE 3, is shown a modified form of the cargo carrying body in which the dolly unit 62 is employed to support a platform 140 having no structure rising from its perimeter and of a size and shape to fit within the space defined by the wall members 28 and 30. A folding strut wheel assembly 142 is secured to the underside of the platform 140 adjacent the forward end of the latter and the platform 140 is provided with means, as at 144, for securement to the fifth wheel 66 of the tractor unit 60.

The cargo carrying body 64 is provided with pairs of struts and associated wheels, shown in dotted lines at 146 in FIGURE 2, retractable within the side walls of the body 64 and extendable to a position in which the body 64 is supported above the ground surface in the absence of the dolly unit 62 and tractor unit 60.

Referring to FIGURE 15, it will be seen that the perimeter of the cargo carrying body 64 is provided with an outwardly projecting shelf 148 having a recess 150 in the underside thereof receiving the upturned free end portion 152 of the hook 88. The shelf 148 has a sloping surface 154 which engages a complementally arranged sloping surface on the structural member 70 with a resilient member 156 interposed therebetween.

It is to be understood that the platform 140 is similarly provided with a shelf perimeter, as shown in FIGURE 15, with reference to the cargo carrying body 64.

In use, the aircraft 22 when supported upon a ground surface by its landing gear assemblies 32 and 34 may receive through one end of the wall members 28 and 30 the vehicle 58 with the cargo carrying body 64 or platform 118 thereon. When the doors 36 and 38 and doors 40 and 42 are shifted laterally away from each other to the position offering no obstruction to passage through the space between the wall members 28 and 30 the vehicle 58 and the attached body or platform is driven into said space.

When the body 64 or platform 118 is secured to the hook 88, the mechanism 68 may elevate the body or platform into the space between the wall members 28 and 30 with the floor 124 of the body 64 or with the platform 118 extending over the open lower end of the space between the wall members 28 and 30 and closing the cargo space provided in the aircraft 22.

Upon reaching its destination, the aircraft 22 may again rest upon a ground surface and with its doors in the open position another vehicle 58 may drive thereunder and receive the cargo body 64 or platform 118 with the elevating mechanism 68 serving as lowering mechanisms to deposit the body or platform on the dolly unit 62 and tractor unit 60.

The lock elements 110 constitute releasable holding means carried by the fuselage 24 and engageable with the cargo carrying body 64 when the latter is supported by the elevating and lowering mechanisms 68.

What is claimed is:

1. In a cargo carrying aircraft, a fuselage, a pair of upstanding elongated wall members arranged in lateral spaced relation positioned beneath said fuselage and having the upper ends dependingly carried by said fuselage, at least two landing gear assemblies arranged in tandem spaced relation positioned beneath each of said wall members and rollably engaging a ground surface when the aircraft is on the ground and having each of said gear assemblies connected to the adjacent wall member for movement from the position engaging the ground surface to a nested position within said wall member, a pair of doors arranged in side by side abutting relation at each of the adjacent ends of said wall members and normally closing the space between said wall member ends and connected to the fuselage for movement from the closing position to a position in which said space is unobstructed for ingress and egress therethrough of a mobile ground vehicle having a cargo carrying body thereon, and elevating and lowering mechanisms arranged in opposed relation carried by said wall members, said mechanisms being each operable to engage a cargo carrying body when supported upon a mobile ground vehicle and positioned between said wall members and lift said cargo carrying body from said vehicle and support said cargo carrying body between said wall members and being operable to lower said cargo carrying body from the supporting position between said wall members to a position of support upon a ground vehicle when positioned below and between said wall members.

2. In a cargo carrying aircraft, a fuselage, a pair of upstanding elongated wall members arranged in lateral spaced relation positioned beneath said fuselage and having the upper ends dependingly carried by said fuselage, at least two landing gear assemblies arranged in tandem spaced relation positioned beneath each of said wall members and rollably engaging a ground surface when the aircraft is on the ground and having each of said gear assemblies connected to the adjacent wall member for movement from the position engaging the ground surface to a nested position within said wall member, a pair of doors arranged in side by side abutting relation at each of the adjacent ends of said wall members and normally closing the space between said wall member ends and connected to the fuselage for movement from the closing position to a position in which said space is unobstructed for ingress and egress therethrough of a mobile ground vehicle having a cargo carrying body thereon, elevating and lowering mechanisms arranged in opposed relation carried by said wall members, said mechanisms being each operable to engage a cargo carrying body when supported upon a mobile ground vehicle and positioned between said wall members and lift said cargo carrying body from said vehicle and support said cargo carrying body between said wall members and being operable to lower said cargo carrying body from the supporting position between said wall members to a position of support upon a ground vehicle when positioned below and between said wall members, and releasable holding means carried by said fuselage and engageable with a cargo carrying body when supported by said mechanisms.

3. In a cargo carrying aircraft, a fuselage, a pair of upstanding elongated wall members arranged in lateral spaced relation positioned beneath said fuselage and having the upper ends dependingly carried by said fuselage, at least two landing gear assemblies arranged in tandem spaced relation positioned beneath each of said wall members and rollably engaging a ground surface when the aircraft is on the ground and having each of said gear assemblies connected to the adjacent wall member for movement from the position engaging the ground surface to a nested position within said wall member, a pair of doors arranged in side by side abutting relation at each of the adjacent ends of said wall members and normally closing the space between said wall member ends and connected to the fuselage for movement from the closing position to a position in which said space is unobstructed for ingress and egress therethrough of a mobile ground vehicle having a cargo carrying body thereon, and elevating and lowering mechanisms arranged in opposed relation carried by said wall members, each of said mechanisms including a hook swingable about a horizontal axis and movable upwardly and downwardly to engage a cargo carrying body when supported upon a mobile ground vehicle and positioned between said wall members and movable upwardly to lift said body from said vehicle to a predetermined height and support said cargo body at said height between said wall members and being operable to move downwardly to lower said cargo carrying body from the supporting position to a position of support upon a mobile ground vehicle when positioned below and between said wall members and swingable about said axis to disengage said cargo carrying body.

4. In a cargo carrying aircraft, a fuselage, a pair of upstanding elongated wall members arranged in lateral spaced relation positioned beneath said fuselage and having the upper ends dependingly carried by said fuselage, at least two landing gear assemblies arranged in tandem spaced relation positioned beneath each of said wall members and rollably engaging a ground surface when the aircraft is on the ground and having each of said gear assemblies connected to the adjacent wall member for movement from the position engaging the ground surface to a nested position within said wall member, a pair of doors arranged in side by side abutting relation at each of the adjacent ends of said wall members and normally closing the space between said wall member ends and connected to the fuselage for movement from the closing position to a position in which said space is unobstructed for ingress and egress therethrough of a mobile ground vehicle having a cargo carrying body thereon, elevating and lowering mechanisms arranged in opposed relation carried by said wall members, each of said mechanisms including a hook swingable about a horizontal axis and movable upwardly and downwardly to engage a cargo carrying body when supported upon a mobile ground vehicle and positioned between said wall members and movable upwardly to lift said body from said vehicle to a predetermined height and support said cargo body at said height between said wall members and being operable to move downwardly to lower said cargo carrying body from the supporting position to a position of support upon a mobile ground vehicle when positioned below and between said wall members and swingable about said axis to disengage said cargo carrying body, and releasable holding means embodying a reciprocable bolt carried by each of said wall members and engageable and disengageable with means provided in a cargo carrying body when supported by said mechanisms.

References Cited in the file of this patent

UNITED STATES PATENTS

| | | |
|---|---|---|
| 1,797,713 | Brogelli | Mar. 24, 1931 |
| 2,441,913 | Taylor | May 18, 1948 |
| 2,697,569 | Wescott | Dec. 21, 1954 |
| 2,876,969 | Tydon et al. | Mar. 10, 1959 |

OTHER REFERENCES

"Flight," Magazine of December 23, 1943, page 693.